US010514836B2

(12) United States Patent
Lai

(10) Patent No.: US 10,514,836 B2
(45) Date of Patent: Dec. 24, 2019

(54) SYSTEM, METHOD, AND APPARATUS FOR COLOR SELECTION

(71) Applicant: ALIBABA GROUP HOLDING LIMITED, George Town, Grand Cayman (KY)

(72) Inventor: Jijia Lai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/184,629

(22) Filed: Jun. 16, 2016

(65) Prior Publication Data

US 2016/0370978 A1  Dec. 22, 2016

(30) Foreign Application Priority Data

Jun. 17, 2015 (CN) .......................... 2015 1 0337379

(51) Int. Cl.
*G06F 3/0488* (2013.01)
*G09G 5/02* (2006.01)
*G06F 3/0484* (2013.01)
*G06F 3/0489* (2013.01)

(52) U.S. Cl.
CPC ...... *G06F 3/04847* (2013.01); *G06F 3/04897* (2013.01); *G09G 5/02* (2013.01); *G09G 2320/0666* (2013.01); *G09G 2354/00* (2013.01)

(58) Field of Classification Search
CPC ................ G09G 5/02; G09G 2354/00; G09G 2320/0626–0673; G06F 3/04897; G06F 3/04845; G06F 3/04847; G06F 3/0488
USPC .......................... 345/594, 694; 715/863, 864
See application file for complete search history.

(56) References Cited

U.S. PATENT DOCUMENTS

| 7,180,524 | B1* | 2/2007 | Axelrod | .................. G09G 5/02 345/593 |
| 7,701,464 | B1 | 4/2010 | Gilra | |
| 9,424,799 | B2* | 8/2016 | Bhatt | |
| 2008/0049043 | A1* | 2/2008 | Titmuss | .............. G06F 3/04845 345/589 |
| 2010/0020117 | A1* | 1/2010 | Tanizoe | ................. G09G 5/005 345/690 |
| 2010/0188415 | A1 | 7/2010 | Pettigrew et al. | |

(Continued)

OTHER PUBLICATIONS

PCT International Search Report and Written Opinion dated Sep. 2, 2016, issued in corresponding International Application No. PCT/US2016/037811 (9 pages).

*Primary Examiner* — Diane M Wills
(74) *Attorney, Agent, or Firm* — Finnegan, Henderson, Farabow, Garrett & Dunner, LLP

(57) ABSTRACT

A method for color selection is disclosed. The method may be implemented by a processor and a non-transitory computer-readable storage medium storing instructions. The method may comprise: determining parameters for color selection, the parameters for color selection being associated with at least a first dimension and a second dimension; obtaining, from the parameters for color selection, a first selected parameter based on a first selection area of the first dimension; generating a second selection area of the second dimension based on the first selected parameter; obtaining, from the parameters for color selection, a second selected parameter based on the second selection area of the second dimension; and displaying a color based on the first and second selected parameters.

20 Claims, 7 Drawing Sheets

(56) References Cited

U.S. PATENT DOCUMENTS

| | | |
|---|---|---|
| 2014/0098120 A1 | 4/2014 | Ritts |
| 2014/0181671 A1* | 6/2014 | Dewhurst ............ G06F 3/04847 |
| | | 715/722 |
| 2014/0292799 A1 | 10/2014 | Shekey |
| 2015/0130808 A1* | 5/2015 | Takagi ..................... G09G 5/06 |
| | | 345/428 |
| 2016/0173726 A1* | 6/2016 | Ubillos ................... H04L 51/24 |
| | | 715/838 |

* cited by examiner

SYSTEM, METHOD, AND APPARATUS FOR COLOR SELECTION

CROSS REFERENCE TO RELATED APPLICATION

The present application is based on and claims the benefits of priority to Chinese Application No. 201510337379.X, filed Jun. 17, 2015, the entire contents of which are incorporated herein by reference.

TECHNICAL FIELD

The present application relates to methods, apparatus, and systems for color selection.

BACKGROUND

Current color selection technologies mainly include two methods. Method 1, as illustrated in FIG. 1, is selecting a color by entering a value representing the color, i.e., a hexadecimal value corresponding to a legal color name. This method is not useful because most people do not know each color's value. If a user does not enter the precise value corresponding to the desired color, the obtained color can be different. Method 2, as illustrated in FIG. 2, is selecting a color from a color palette. This method can usually be found in mobile phone applications. However, due to limited screen sizes of mobile devices, a larger number of color options, and a large finger press area size, it can be difficult to accurately select a color of desire without multiple attempts. Thus, the second method can be inefficient and inaccurate due to its complicated operation requirement.

SUMMARY

One aspect of the present disclosure is directed to a method for color selection. The method may be implemented by a processor and a non-transitory computer-readable storage medium that stores a set of instructions that is executable by at least one processor of a computer system to cause the computer system to perform a method for color selection, the method comprising: determining parameters for color selection, the parameters for color selection being associated with at least a first dimension and a second dimension; obtaining, from the parameters for color selection, a first selected parameter based on a first selection area of the first dimension; generating a second selection area of the second dimension based on the first selected parameter; obtaining, from the parameters for color selection, a second selected parameter based on the second selection area of the second dimension; and displaying a color based on the first and second selected parameters.

Another aspect of the present disclosure is directed to an apparatus for color selection. The apparatus may comprise a memory that stores a set of instructions; and a hardware processor configured to execute the set of instructions to: determine parameters for color selection, the parameters for color selection being associated with at least a first dimension and a second dimension; obtain, from the parameters for color selection, a first selected parameter based on a first selection area of the first dimension; generate a second selection area of the second dimension based on the first selected parameter; obtain, from the parameters for color selection, a second selected parameter based on the second selection area; and display a color based on the first and second selected parameters.

Another aspect of the present disclosure is directed to a non-transitory computer-readable storage medium storing one or more programs, the one or more programs comprising instructions which, when executed by a processor of a computer system, cause the computer system to perform a method. The method may comprise determining parameters for color selection, the parameters for color selection being associated with at least a first dimension and a second dimension; obtaining, from the parameters for color selection, a first selected parameter based on a first selection area of the first dimension; generating a second selection area of the second dimension based on the first selected parameter; obtaining, from the parameters for color selection, a second selected parameter based on the second selection area of the second dimension; and displaying a color based on the first and second selected parameters.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
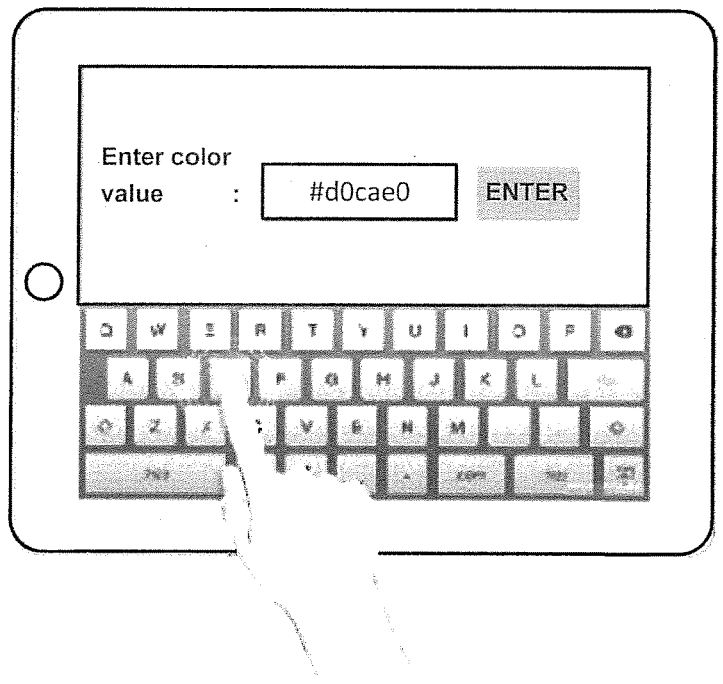
FIG. 1 is a graphical illustration of a method for color selection in prior art.
Figure 2:
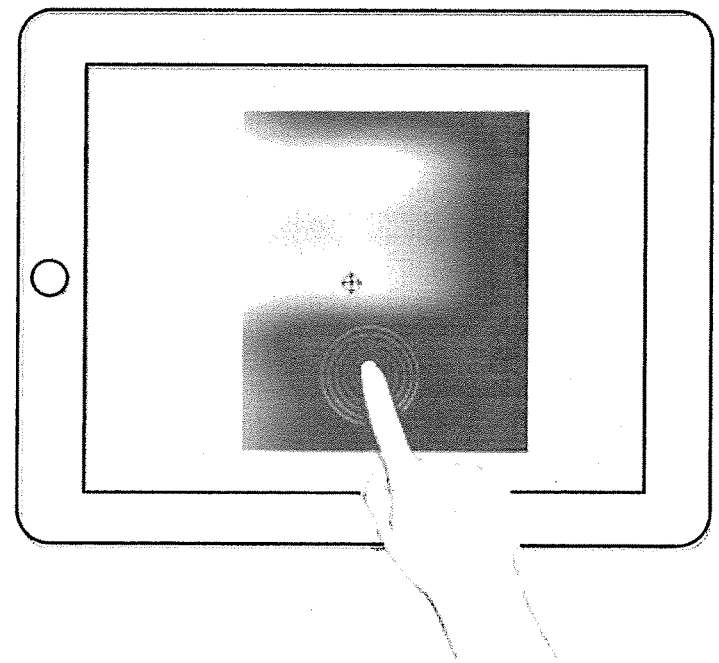
FIG. 2 is a graphical illustration of another method for color selection in prior art.
Figure 3:
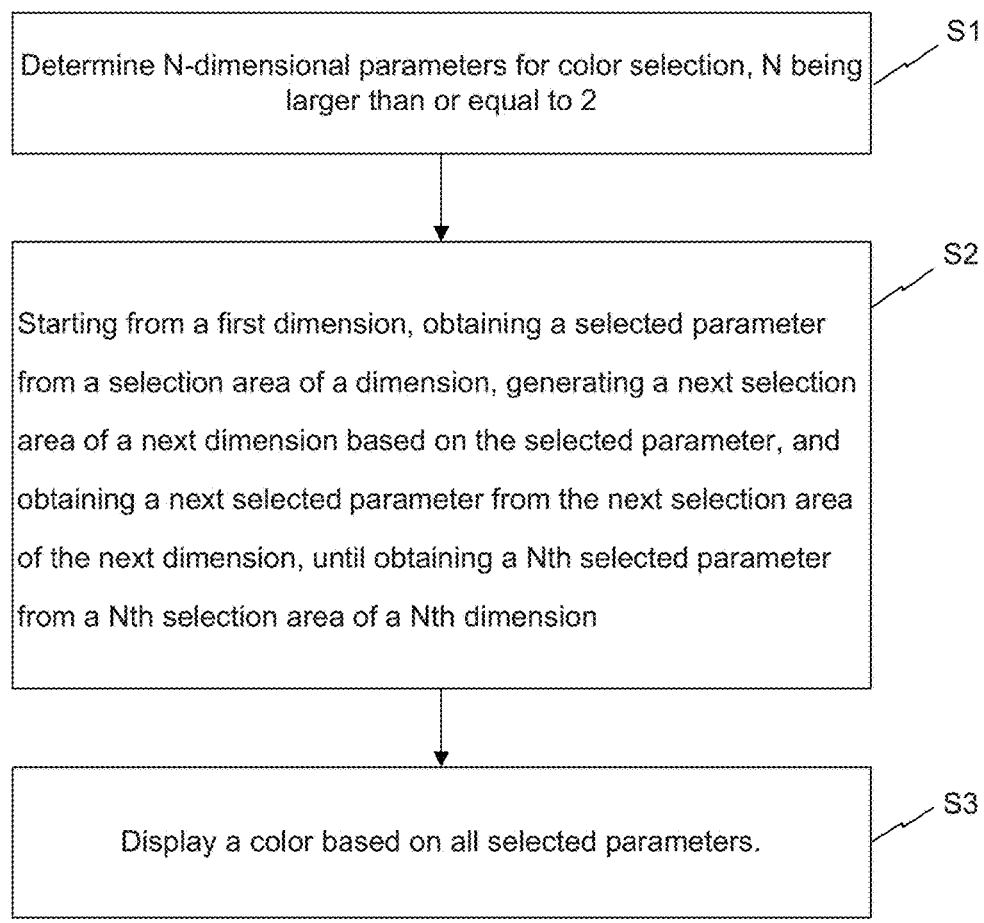
FIG. 3 is a flow diagram illustrating a method for color selection, according to an exemplary embodiment.

FIG. 3 is a flow diagram illustrating a method 300 for color selection, according to an exemplary embodiment. The method may be performed by a computer system. The computer system may comprise a processor and a non-transitory computer-readable storage medium storing instructions that, when executed by the processor, perform the steps described below.

At step S1, the computer system determines N-dimensional parameters for color selection, N being larger than or equal to 2. In some embodiments, the larger number N becomes, the more accurate the color selection can achieve.

At step S2, the computer system obtains a first selected parameter from a first selection area of a first dimension, generates a second selection area of a second dimension based on the first selected parameter, obtains a second selected parameter from the second selection area of the second dimension, generates a third selection area of a third dimension from the second selected parameter . . . and obtains a Nth selected parameter from the Nth selection area of the Nth dimension. That is, the computer system obtains a first selected parameter from a first selection area of a first dimension, generates a second selection area of a second dimension based on the first selected parameter, and recursively repeats the obtaining-generating step until obtaining a Nth selected parameter from a Nth selection area of a Nth dimension. The parameter(s) may be selected by a user.

Since a selection area of a dimension is generated based on a selected parameter of an immediately prior dimension, the generated selection area can be dependent on the selection of the parameter, and can sequentially affect a next obtained parameter from the generated selection area. Thus, a selection of a Xth parameter can determine a range of selection choices for a (X+1)th parameter, and by recursion, the range of selection choices can be narrowed down. A desired color can be accurately selected at the end.

At step S3, the computer system displays a color based on all selected parameters, i.e. from the first to the Nth parameter. With a dimension number N larger than or equal to 2, the user can quickly and accurately select a color.

In some exemplary embodiments, generating the second selection area of the second dimension based on the first selected parameter of step S2 may include generating the second selection area of the second dimension based on the first selected parameter and a first operation by the user. The first operation may be performed in the first selection area. Generating an (A+1)th selection area of an (A+1)th dimension from an Ath selected parameter may include generating the (A+1)th selection area of the (A+1)th dimension from the Ath selected parameter and a first operation by the user in the Ath selection area. The first operation may include preset operation gestures such as clicking, pressing, swiping, sliding, dragging, or zooming in/out. In one example, the user may press on a part of the Ath selection area and swipe upwards. The operation of swiping upwards may be the first operation. The part of the Ath selection area may indicate a selected Ath parameter, and after the first operation is performed, correspondingly, the (A+1)th selection area can be generated. When the user selects the Ath parameter, for example, by pressing on a part of the Ath selection area, the (A+1)th selection area may not be generated until an operation, such as swiping upwards in the Ath selection area, is performed by the user. This may prevent unintended operations. For example, even if a user misclicks on a part of a selection area, a next selection area may not be generated until the user performs the preset operation. Thus, the user can still click on or select another part of the selection area before generating the next selection area. For another example, if a user does not want to proceed with a selected parameter on a selection area, the user may just not perform the preset operation. The selection area may stay, and a next selection area may not be generated.

Figure 4:
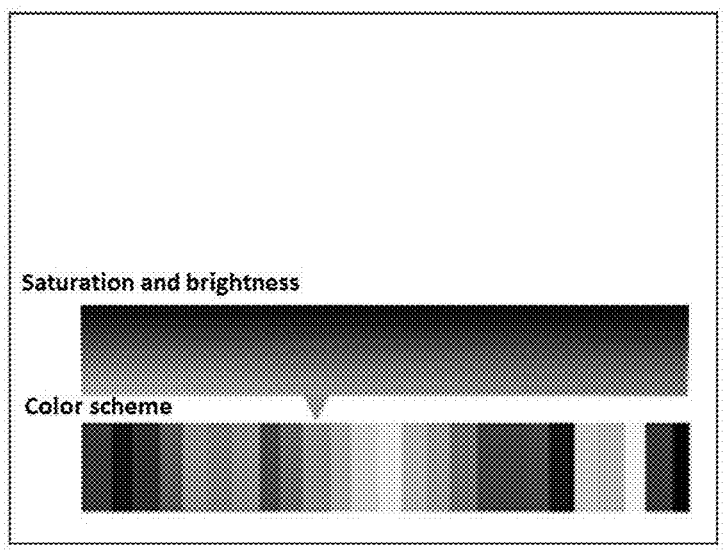
FIG. 4 is a graphical illustration of a 2-dimensional parameters interface, according to an exemplary embodiment.

In some exemplary embodiments, step S1 further includes determining, by the computer system, 2-dimensional parameters for color selection. FIG. 4 is a graphical illustration of a 2-dimensional parameters interface for color selection, according to an exemplary embodiment. A first-dimensional parameter of the 2-dimensional parameters is color scheme. A second-dimensional parameter of the 2-dimensional parameters is a combination of saturation and brightness. The two parameters can help users to select colors more efficiently and quickly. The saturation, also known as colorfulness, can refer to an intensity or purity of a color. The saturation may indicate a percentage of grey, from 0%, i.e., grey, to 100%, i.e., complete saturation.

Figure 9:
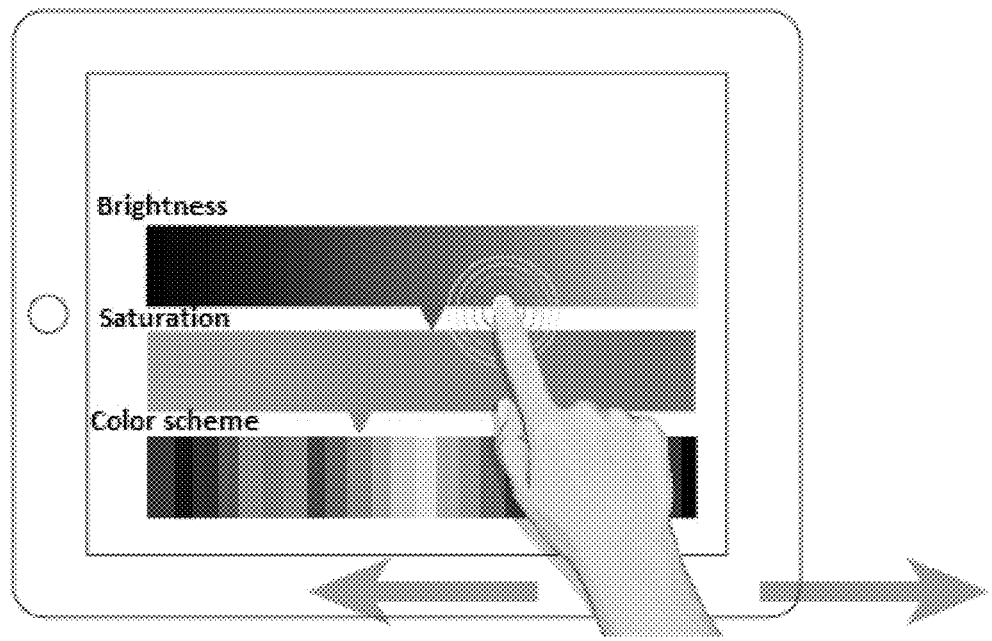

In some exemplary embodiments, step S1 further includes determining, by the computer system, 3-dimensional parameters for color selection. As illustrated in FIG. 9, a first-dimensional parameter of the 3-dimensional parameters is color scheme, a second-dimensional parameter is saturation, and a third-dimensional parameter is brightness. Alternatively, a first-dimensional parameter is color scheme, a second-dimensional parameter is brightness, and a third-dimensional parameter is saturation. The three parameters can help users to select colors more efficiently and quickly.

Figure 5:
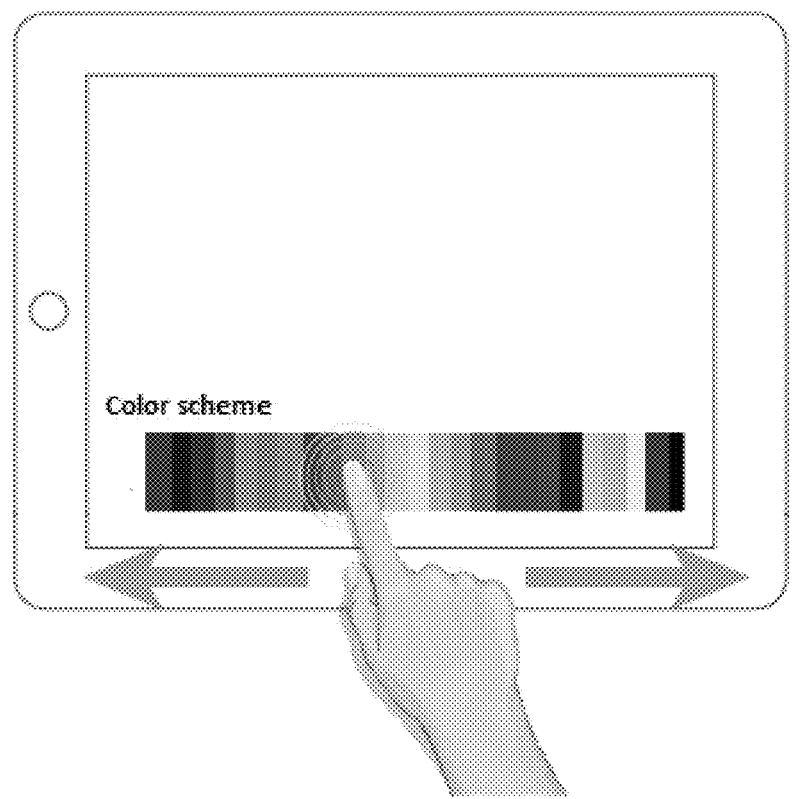
FIGS. 5-10 are graphical illustrations of 3-dimensional parameters interfaces, according to an exemplary embodiment.
Figure 6:
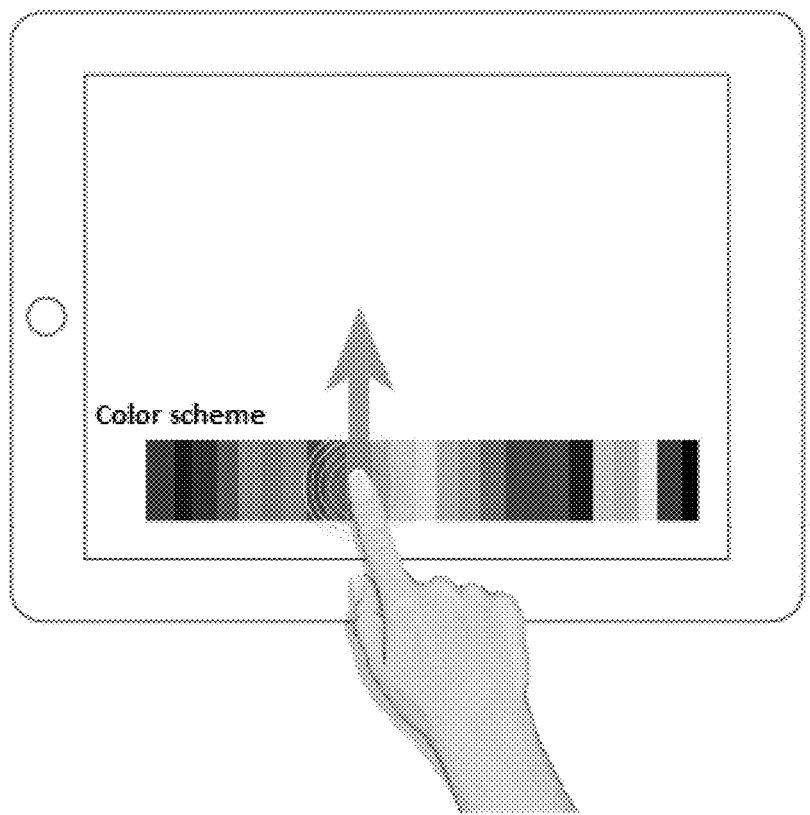
Figure 7:
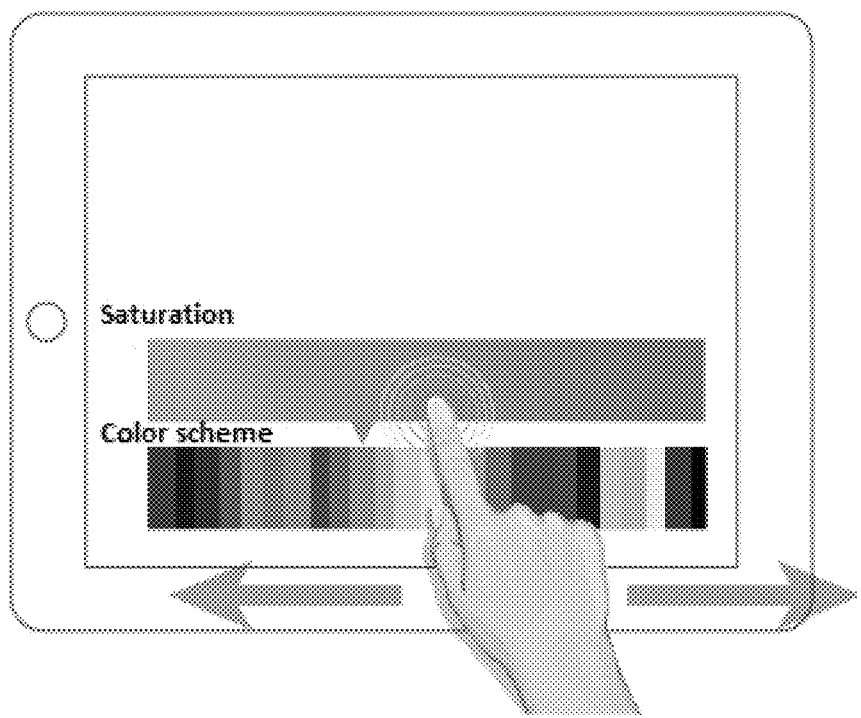
Figure 8:
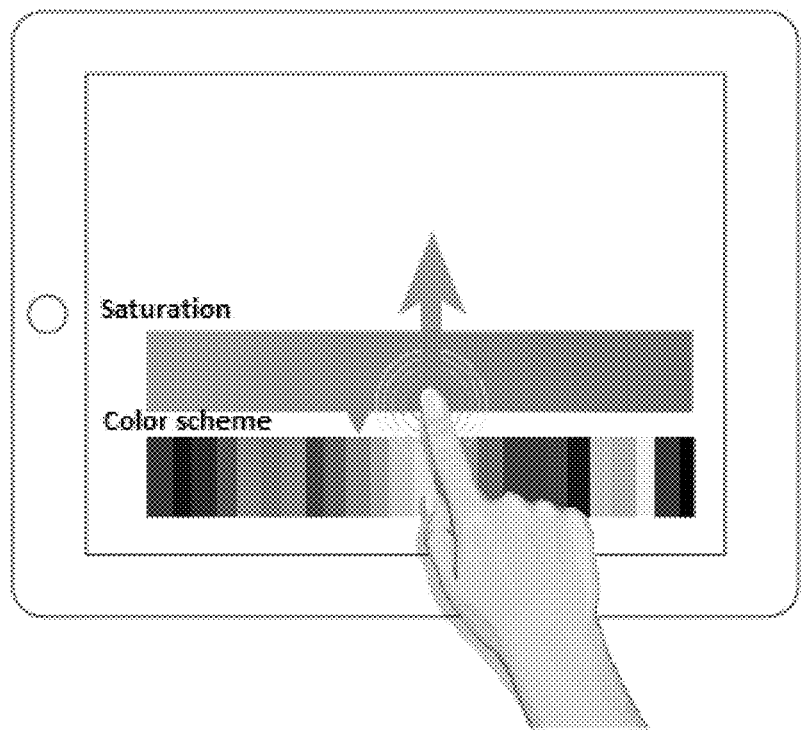
Figure 10:
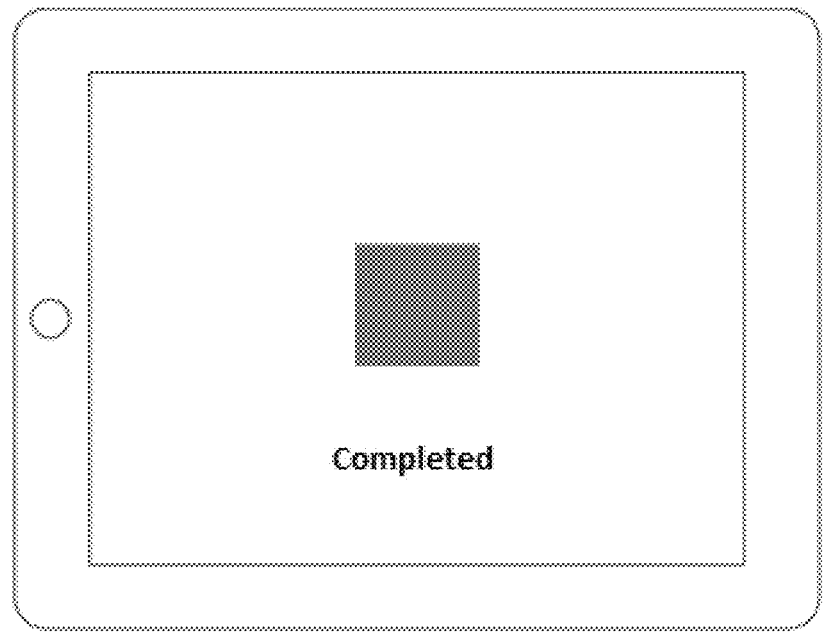

FIGS. 5-10 are graphical illustrations of 3-dimensional parameters interfaces, according to an exemplary embodiment. The first parameter may be color scheme, the second parameter may be saturation, and the third parameter may be brightness. A user may keep pressing a finger on a screen throughout steps from FIG. 5 to FIG. 9. As illustrated in FIG. 5, moving the finger left and right in the color scheme selection bar can select the first parameter from the color scheme selection bar in a first dimension. As illustrated in FIG. 6, after selecting the first parameter in the color scheme selection bar and with the finger still pressed on the screen, a second selection area for saturation selection can be triggered to display by dragging the finger upwards. As illustrated in FIG. 7, with the finger still pressed on the screen, moving the finger left and right in the saturation selection bar can select the second parameter from the saturation selection bar in the second dimension. As illustrated in FIG. 8, after selecting the second parameter in the saturation selection bar and with the finger still pressed on the screen, a third selection area for brightness selection can be triggered to display by dragging the finger upwards. As illustrated in FIG. 9, with the finger still pressed on the screen, moving the finger left and right in the brightness selection bar can select the third parameter from the brightness selection bar in the third dimension. As illustrated in FIG. 10, after selecting all three parameters, the user may release the finger from the screen. Thus, the entire process may only take one press by the user and can help the user select a color efficiently and accurately.

In some exemplary embodiments, the selection area(s) can have many different shapes, including rectangle, square, circle, and fan. Examples of the selection area are illustrated in FIGS. 4 to 9. The selection area's shape or size can also be adjusted according to application scenarios, such as a display shape, a display size, or a display content of a display displaying the selection area.

Figure 11:
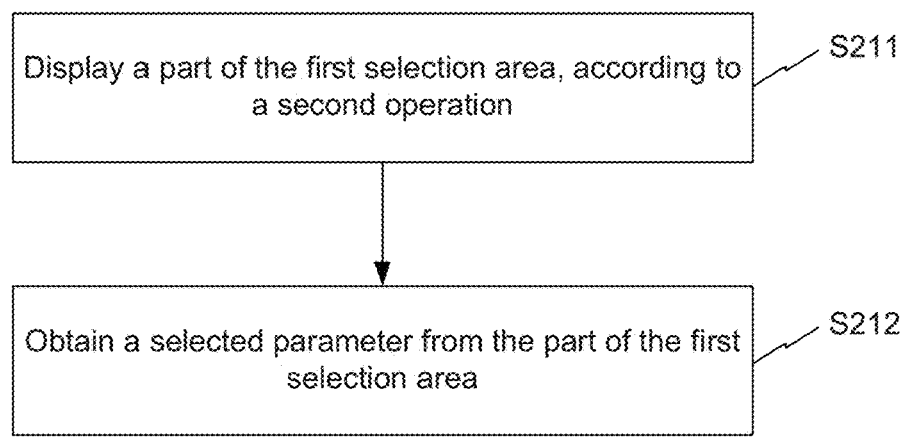
FIG. 11 is a flow diagram illustrating another method for color selection, according to an exemplary embodiment.
Figure 12:
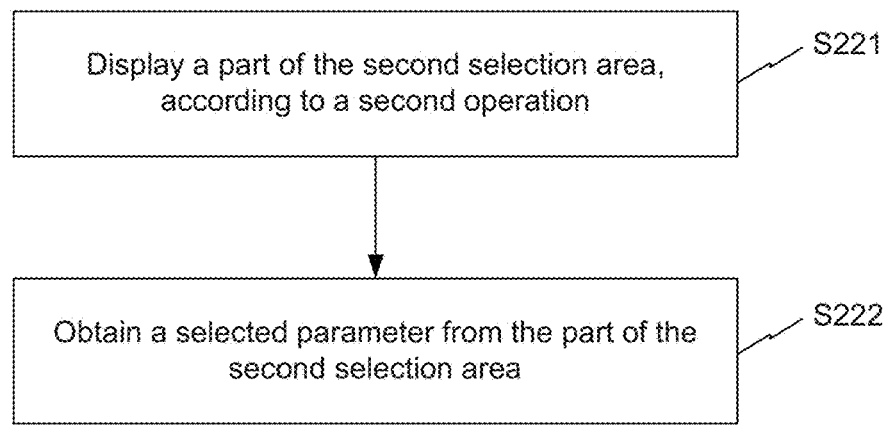
FIG. 12 is a flow diagram illustrating another method for color selection, according to an exemplary embodiment.

FIGS. 11 and 12 are flow diagrams illustrating another method for color selection, according to an exemplary embodiment. In some exemplary embodiments, when a boundary of a selection area exceeds a screen boundary displaying the selection area, step S2 further includes steps illustrated in FIG. 11 or 12. FIG. 11 includes S211, in which the computer system, instead of displaying an entire first selection area, displays a part of the first selection area, according to a second operation, and S212, in which the computer system obtains a selected parameter from the part of the first selection area. FIG. 12 includes S221, in which the computer system, instead of displaying an entire second selection area, displays a part of the second selection area, according to a second operation, and S222, in which the computer system obtains a selected parameter from the part of the second selection area.

In another word, S2 may include a first step, in which the computer system switches from displaying an entire selection area to displaying a part of the selection area, according to a second operation. In some exemplary embodiments, the selection area may be displayed on a mobile phone with a limited screen size. If the selection area is fully displayed on the mobile phone, the displayed content may look squeezed and may affect the accuracy of color selection by the user. Thus, when the selection area's boundary exceeds the screen's boundary, the computer system may switch among displaying different parts of the selection area, according to a second operation of the user, such that the user can pick a desired part of the selection area to select the desired color. The second operation may include preset operation gestures such as clicking, pressing, swiping, sliding, dragging, or zooming in/out. The selection area may be a first, a second, or a Nth selection area. For example, on the color scheme selection area illustrated in FIG. 5 or on the saturation selection area illustrated in FIG. 7, sliding left or right on the screen can accordingly select different parts, e.g. a left part or a right part, of the selection area.

S2 may also include a second step, in which the computer system obtains a selected parameter from the part of the selection area. Thus, even with a relatively small display screen, users can still accurately select the desire colors, without decreasing a selection area size or losing any selection area.

In some exemplary embodiments, step S2 may include displaying a selection area with a previous selection area. In one example illustrated in FIG. 9, when a selection area is generated, several previous selection areas can be kept on the same screen, so that the user can adjust selected parameters in any of the displayed selection areas. The selection area may be a first, a second, or a Nth selection area.

In some exemplary embodiments, step S2 may include displaying only a latest selection area. For example, if a mobile phone has a limited screen size for displaying a selection area, the computer system may only display a latest selection area, without displaying a previous selection area. In some embodiments, to allow users to adjust selected parameters, the computer system may back up to and may only display a previous selection area, according to an operation of the user. Thus, the user can conveniently adjust a previously selected parameter, while the screen area usage is conserved.

In some exemplary embodiments, S2 further includes highlighting a selected parameter. For example, when a mobile phone screen for displaying a selection area has a limited size, the computer system may highlight a selected parameter. FIGS. 5-9 illustrate highlighting selected parameters in selection areas with a halo effect. The selected parameter can also be brightened or labeled. Thus, the user can be reminded of selected parameters to avoid wrong selections. The user can also adjust selection accordingly, if finding a wrong selection.

Figure 13:
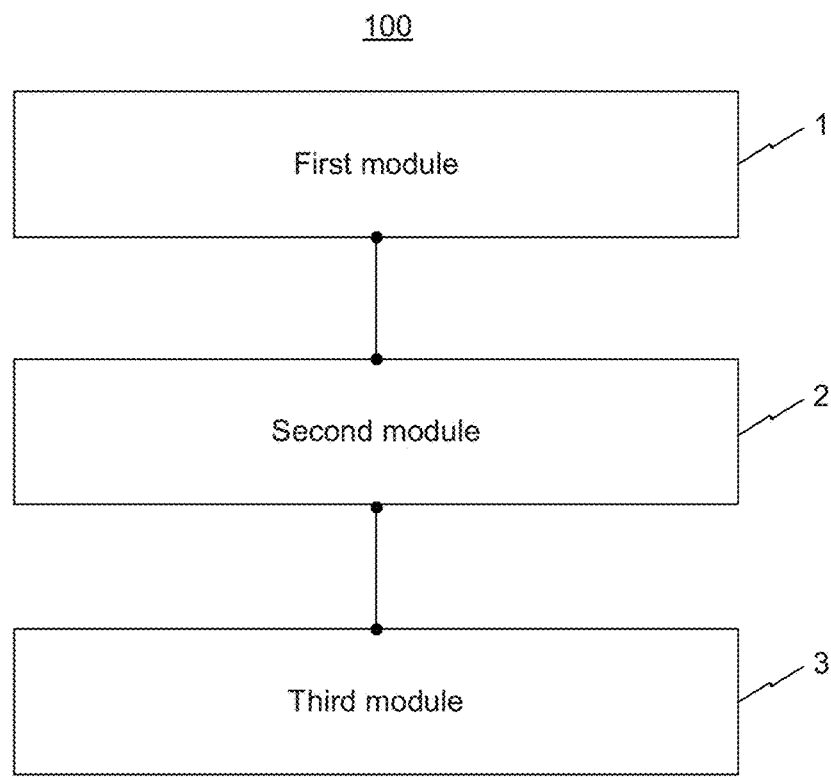
FIG. 13 is a block diagram illustrating an apparatus for color selection, according to an exemplary embodiment.

FIG. 13 is a block diagram illustrating an apparatus 100 for color selection, according to an exemplary embodiment. In some exemplary embodiments, since the selected parameter, the selection area, and the dimension may appear in sequence from 1 to N on a screen, the sequence may be defined by words such as "next," "previous," or "latest." Descriptions of a selected parameter/selection area/dimension and a next selected parameter/selection area/dimension can be applied to any pair of selected parameters/selection areas/dimensions with the same sequence. Apparatus 100 may comprise:

a first module 1 configured to determine N-dimensional parameters for color selection, N being larger than or equal to 2;

a second module 2 configured to repeat, starting from a first dimension:

obtaining a selected parameter from a selection area of a dimension;

generating a next selection area of a next dimension based on the selected parameter; and obtaining a next selected parameter from the next selection area of the next dimension; until obtaining a Nth selected parameter from a Nth selection area of a Nth dimension; and a third module 3 configured to display a color based on all selected parameters.

Operations of the first to third modules are described above with reference to the method for color selection.

The second module may be further configured to generate the next selection area, or any selection area, based on a first operation by a user.

The first module may be further configured to determine 2-dimensional parameters, including a color scheme parameter and a combination parameter of saturation and brightness, for color selection.

The first module may be further configured to determine 3-dimensional parameters, including a color scheme parameter, a saturation parameter, and a brightness parameter, for color selection.

The selection area may be square, rectangular, circular, or fan-shaped.

The second module may be further configured to:

when the selection area boundary exceeds a screen boundary displaying the selection area, display a part of the selection area, according to a second operation by the user; and obtain the selected parameter from the displayed part of the selection area of the dimension.

The second module may be further configured to:

when the next selection area boundary exceeds a screen boundary displaying the next selection area, display a part of the next selection area, according to a second operation by the user; and obtain the next selected parameter from the displayed part of the next selection area of the next dimension.

In some exemplary embodiments, the second module may display the next selection area with the selection area on the same screen.

In some exemplary embodiments, the second module may display only a latest selection area on a screen.

In some exemplary embodiments, the second module may highlight selected parameter(s).

A person skilled in the art can further understand that, various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory and so on) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, or any other non-transmission media that may be used to store information capable of being accessed by a computer device. The computer-readable storage medium is non-transitory, and does not include transitory media, such as modulated data signals and carrier waves.

The specification has described methods, apparatus, and systems for color selection. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for color selection, implemented by one or more processors and a non-transitory computer-readable storage medium storing instruction, comprising:
   determining parameters for color selection, the parameters for color selection being associated with at least a first dimension and a second dimension;
   obtaining, from the parameters for color selection, a first selected parameter based on a first selection area of the first dimension on a screen of an electronic mobile device, the first selected parameter being selected by a first touch input on the first selection area corresponding to the first selected parameter;
   after obtaining the first selected parameter, triggering a display of a second selection area of the second dimension on the screen based on the first selected parameter upon receiving a touch operation;
   obtaining, from the parameters for color selection, a second selected parameter based on the second selection area, the second selected parameter being selected by a second touch input on the screen from a position of the first touch input to the second selection area corresponding to the second selected parameter; and
   displaying a color on the screen based on the first and second selected parameters.

2. The method of claim 1, wherein determining the parameters for color selection includes determining a color scheme parameter associated with the first dimension and a combination parameter of saturation and brightness associated with the second dimension.

3. The method of claim 1, wherein the parameters for color selection are associated with at least three dimensions; wherein determining the parameters for color selection includes determining a color scheme parameter associated with the first dimension, a saturation parameter associated with the second dimension or with a third dimension, and a brightness parameter associated with the third dimension or with the second dimension.

4. The method of claim 1, wherein the first selection area and/or the second selection area is square, rectangular, circular, or fan-shaped.

5. The method of claim 1, wherein obtaining the first selected parameter from the first selection area of the first dimension includes:
   when the first selection area boundary exceeds a screen boundary displaying the first selection area, displaying a part of the first selection area, according to an operation by a user; and
   obtaining the first selected parameter from the displayed part of the first selection area of the first dimension.

6. The method of claim 1, wherein obtaining the second selected parameter from the second selection area of the second dimension includes:
   after the second selection area boundary exceeds a screen boundary displaying the second selection area, displaying a part of the second selection area, according to an operation by a user; and
   obtaining the second selected parameter from the displayed part of the second selection area of the second dimension.

7. The method of claim 1, wherein the second selection area is displayed with the first selection area on the screen.

8. The method of claim 1, wherein only the second selection area is displayed on the screen.

9. The method of claim 1, wherein the first selected parameter is highlighted.

10. The method of claim 1, wherein displaying a color on the screen based on the first and second selected parameters is performed in response to the second input on the second selection area corresponding to the second selected parameter being released.

11. An electronic mobile device for color selection, comprising:
    a memory that stores a set of instructions; and
    a hardware processor configured to execute the set of instruction to cause the electronic mobile device to:
    determine parameters for color selection, the parameters for color selection being associated with at least a first dimension and a second dimension;
    obtain, from the parameters for color selection, a first selected parameter based on a first selection area of the first dimension on a screen of the electronic mobile device, the first selected parameter being selected by a first touch input on the first selection area corresponding to the first selected parameter;
    after obtaining the first selected parameter, trigger display of a second selection area of the second dimension on the screen based on the first selected parameter upon receiving a touch operation;
    obtain, from the parameters for color selection, a second selected parameter based on the second selection area, the second selected parameter being selected by a second touch input on the screen from a position of the first touch input to the second selection area corresponding to the second selected parameter; and
    provide for display a color on the screen based on the first and second selected parameters.

12. The electronic mobile device of claim 11, wherein the hardware processor is further configured to execute the set of instructions to generate the second selection area based on a first operation by a user.

13. The electronic mobile device of claim 11, wherein the hardware processor is further configured to execute the set of instructions to determine a color scheme parameter associated with the first dimension and a combination parameter of saturation and brightness associated with the second dimension.

14. The electronic mobile device of claim 11, wherein the parameters for color selection are associated with at least three dimensions; wherein the hardware processor is further configured to execute the set of instructions to determine a color scheme parameter associated with the first dimension, a saturation parameter associated with the second dimension or with a third dimension, and a brightness parameter associated with the third dimension or with the second dimension.

15. The electronic mobile device of claim 11, wherein the first selection area and/or the second selection area is square, rectangle, circular, or fan-shaped.

16. The electronic mobile device of claim 11, wherein the hardware processor is further configured to execute the set of instructions to:
when the first selection area boundary exceeds a screen boundary displaying the first selection area, display a part of the first selection area, according to an operation by a user; and
obtain the first selected parameter from the displayed part of the first selection area of the first dimension.

17. The electronic mobile device of claim 11, wherein the hardware processor is further configured to execute a set of instructions to:
after the second selection area boundary exceeds a screen boundary displaying the second selection area, display a part of the second selection area, according to an operation by a user; and
obtain the second selected parameter from the displayed part of the second selection area of the second dimension.

18. The electronic mobile device of claim 11, wherein the second selection area is displayed with the first selection area on the screen.

19. The electronic mobile device of claim 11, wherein only a latest selection area is displayed on the screen.

20. A non-transitory computer-readable storage medium that stores a set of instruction that is executable by at least one processor of an electronic mobile device to cause the electronic mobile device to perform a method for color selection, the method comprising:
determining parameters for color selection, the parameters for color selection being associated with at least a first dimension and a second dimension;
obtaining, from the parameters for color selection, a first selected parameter based on a first selection area of the first dimension on a screen of the electronic mobile device, the first selected parameter being selected by a first touch input on the first selection area corresponding to the first selected parameter;
after obtaining the first selected parameter, triggering a display of a second selection area of the second dimension on the screen based on the first selected parameter upon receiving a touch operation;
obtaining, from the parameters for color selection, a second selected parameter based on the second selection area of the second dimension, the second selected parameter being selected by a second touch input on the screen from a position of the first touch input to the second selection area corresponding to the second selected parameter; and
displaying a color on the screen based on the first and second selected parameters.

\* \* \* \* \*